United States Patent [19]

Oury et al.

[11] Patent Number: 4,531,630
[45] Date of Patent: Jul. 30, 1985

[54] LOAD SENSOR

[75] Inventors: Robert F. Oury, Gilberts; Charles J. Arndt, Elk Grove Village, both of Ill.

[73] Assignee: Rotec Industries, Inc., Elmhurst, Ill.

[21] Appl. No.: 508,834

[22] Filed: Jun. 29, 1983

[51] Int. Cl.³ .............................................. G01G 11/08
[52] U.S. Cl. ................................... 198/505; 177/154; 177/229; 222/56; 198/524
[58] Field of Search ............... 198/301, 311, 505, 524; 222/39, 56, 58; 414/468; 177/45–48, 154, 156, 229; 193/DIG. 2

[56] References Cited

U.S. PATENT DOCUMENTS

| | | | |
|---|---|---|---|
| 1,852,385 | 4/1932 | Weigert | 198/524 |
| 2,430,407 | 11/1947 | Nelson | 198/524 |
| 3,203,531 | 8/1965 | Pretot, Jr. | 198/505 |
| 3,598,224 | 8/1971 | Oury | 198/301 |
| 4,379,663 | 4/1983 | Allison | 222/56 X |

Primary Examiner—Joseph E. Valenza
Assistant Examiner—Jonathan D. Holmes
Attorney, Agent, or Firm—Allegretti, Newitt, Witcoff & McAndrews, Ltd.

[57] ABSTRACT

A load sensor for a concrete conveyor having a tremie which sounds a signal and releases the tremie in case the tremie becomes overloaded. The device has a U-shaped deflection yoke between the tremie and the conveyor which deflects under the weight of the tremie to close switches and actuate the appropriate safety device. All parts are protected from concrete to insure proper functioning.

9 Claims, 7 Drawing Figures

LOAD SENSOR

This invention relates to an improvement in safety devices for concrete-placing conveyors having a tremie for directing the flow of concrete discharged from the end of the conveyor. More particularly, it relates to an improved load sensor which actuates signaling means and releases the tremie when an overload occurs due to concrete build up.

In the operation of boom-mounted conveyors which are elevated above the point of concrete deposition, it is customary to feed the concrete from the end of the conveyor to the upper end of a tremie, or "elephant's trunk", made of rubber or the like. This permits placing the concrete precisely where desired, and, properly used, eliminates seeregation (separation of aggregate from cement paste). A boom-mounted conveyor of this type is disclosed in U.S. Pat. Re. No. 29,110. On occasion, the tremie becomes obstructed and the concrete builds up inside rather than flowing through directly. Since the volume of concrete flowing into a tremie and the rate of flow are high, the tremie can become filled with concrete very quickly. When this occurs, the weight may pull the conveyor to the ground and cause the vehicle, or pylon, on which the boom is mounted, to overturn or to distort. The workmen may be injured and the equipment damaged if this should occur.

U.S. Pat. Re. No. 29,110 discloses a means for signaling the conveyor operator, stopping the conveyor, and dropping the tremie when an overload occurs, or is about to occur. In this apparatus, the funnel feeding the tremie is suspended from the end of the conveyor by a pair of coil springs. The springs are not accurate in sensing the weight, especially after they become caked with concrete, which they do. This can result in premature or late actuation of the controls for signaling or for dropping the tremie. Also, the simple mechanical nature of this device lends itself to tampering in attempt to prevent "nuisance" tripping.

The present invention provides an improved device for sensing any excess increased weight in the tremie and for actuating the electrical circuits to the conveyor motors, the signaling horns, and the detaching means for the tremie. The device of the invention is characterized by accuracy and the ability to function even after the conveyor has been used to transport concrete for some time. Concrete, of course, hardens on conveying equipment if not removed promptly, and tends to build up and adversely affect the operation.

These and other objects of the invention will become apparent from the following description when read in connection with the accompanying drawings in which FIG. 1 is a front elevational view showing a funnel connected to the end of a conveyor, the funnel being equipped with a load sensor and trigger means for releasing the tremie.

Figure 1:
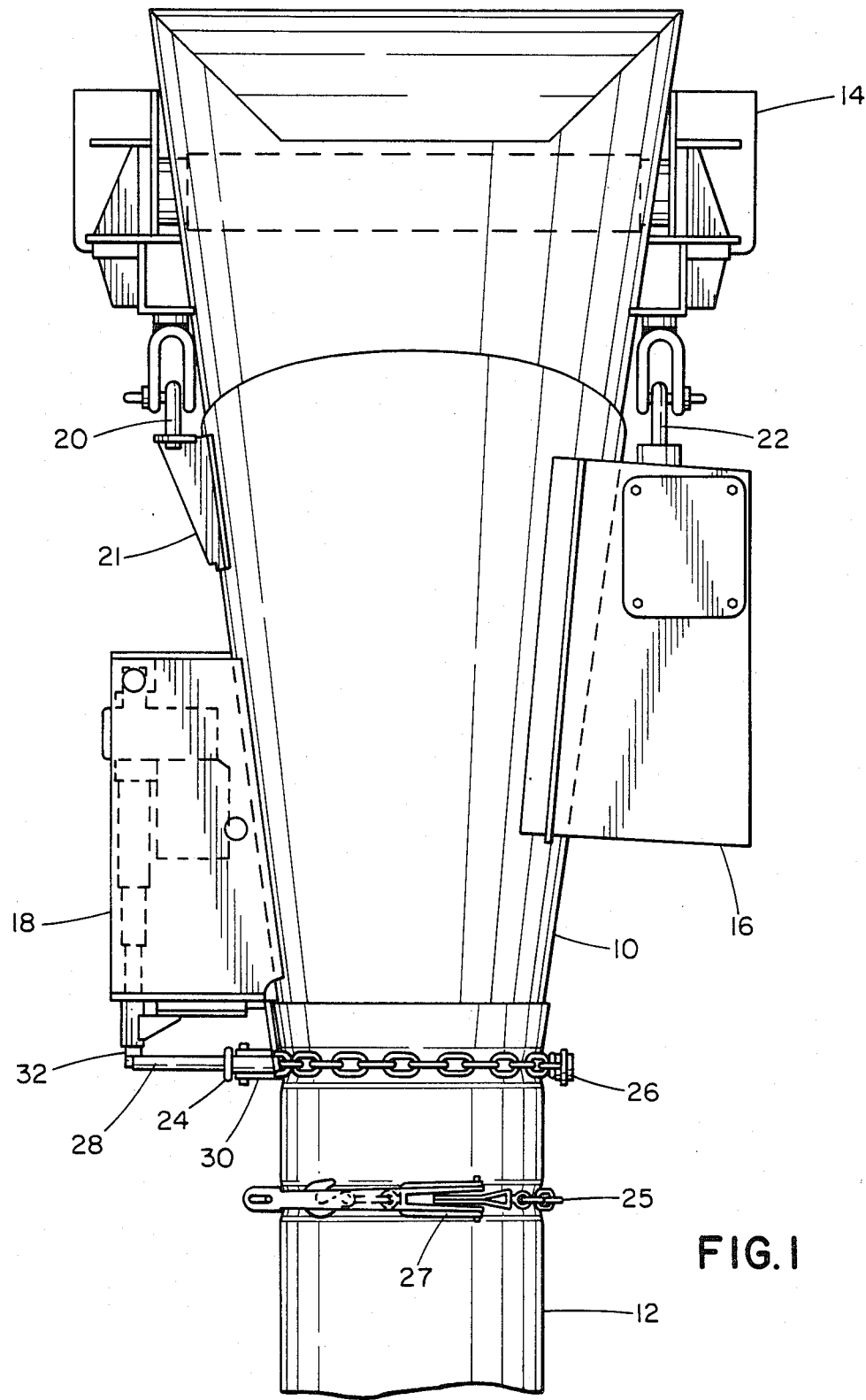
Figure 2:
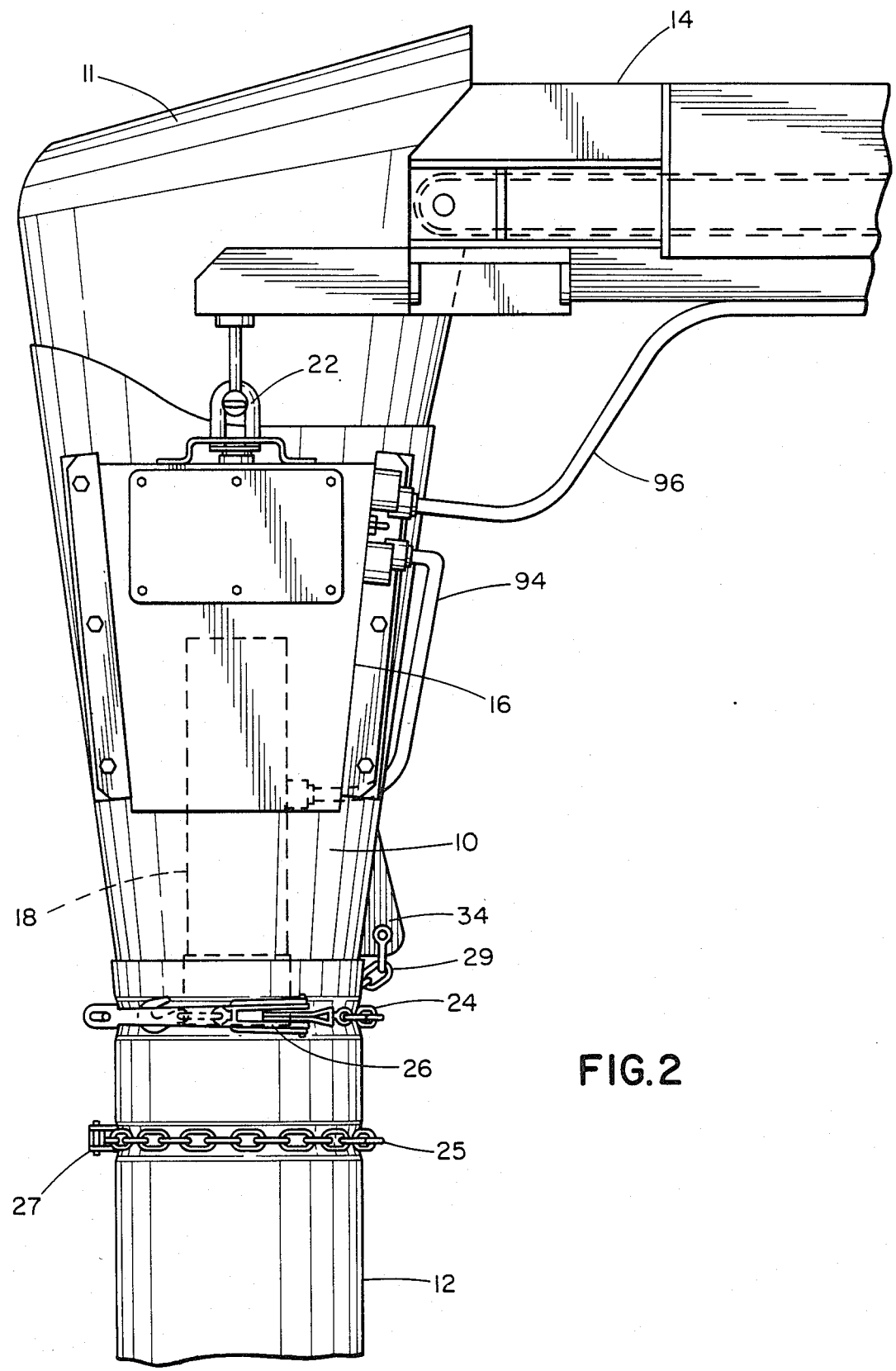
FIG. 2 is a side elevational view of the apparatus of FIG. 1.

Referring to FIGS. 1 and 2, funnel 10 is suspended at two points from the conveyor 14. Concrete coming off the end of the conveyor is directed by a boot 11 into the funnel. A tremie 12 made from rubber coated fabric or plastic material fits over the smaller, lower end of the funnel, and is secured by means of a chain and shackle, which embraces the end of the tremie overlying the lower end of the funnel. A trigger housing 18 is mounted on the left-hand side of the funnel, as viewed in FIG. 1, and the load sensor housing 16 is secured to the opposite side of the funnel near the top. The weight of the funnel and the tremie is carried by links 20,22 mounted on opposed sides of the funnel near the top. The link 20 is secured to a bracket 21 welded to the surface of the funnel. The link 22 is secured to the load sensing device as will be explained below. The chain 24 which secures the tremie to the lower end of the funnel, is welded at one end to the trigger bracket 30 and at the other end the end link encircles the arm 28 pivotally mounted on the bracket 30 welded to the funnel. A toggle 26 is interposed in the chain to permit tightening the chain around the tremie.

A trigger 32 mounted for vertical movement on the end of a linear actuator 36 is normally engaged with the end of the arm 28 to prevent rotation thereof by the force of the tightened chain. When the controls call for dropping the tremie, the trigger is retracted, which releases the arm 28 to permit rotation toward the funnel. This causes the chain to fall off the arm and release its grip on the tremie. A second chain 25, with toggle 27, embraces the tremie and compresses it against an inside ring, not shown, and provides means for holding on to the tremie. A bracket 34 (FIG. 2) on the funnel serves, through a connecting chain 29 and the holding means 25,27, to keep the tremie from dropping freely to the ground after it has been released. The fall is limited by the length of chain 29 which is long enough to permit the weight of the tremie to be supported by the ground.

Figure 3:
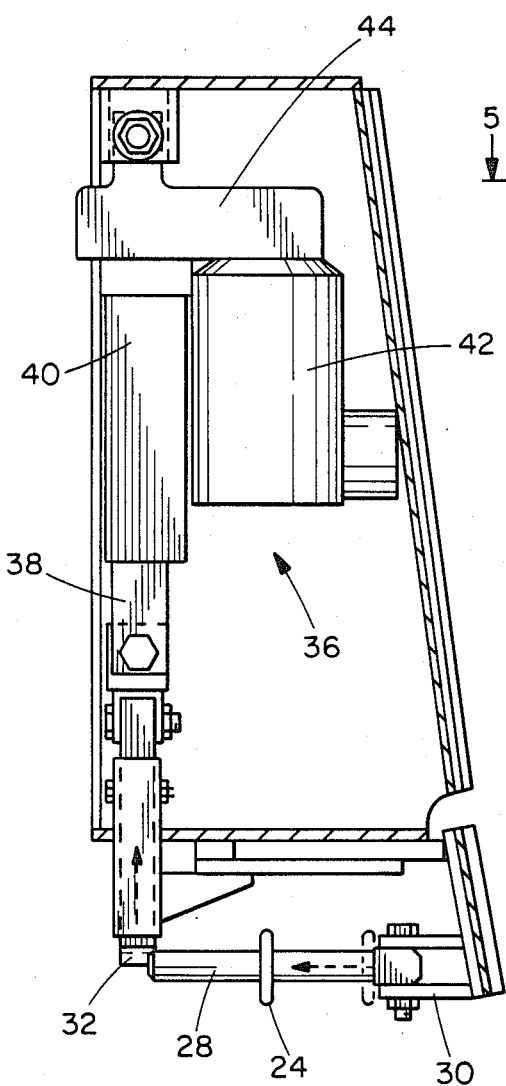
FIG. 3 is a side elevational view of the trigger release mechanism.

The trigger and linear actuator are shown in more detail in FIG. 3. The linear actuator is a commercial piece of equipment and consists of a screw 38 which rotates in a threaded sleeve 40. A motor 42 operating through a gear train 44 causes the sleeve 40 to rotate, thus moving the screw up and down within the sleeve. The trigger 32 is secured to the end of the screw and releases the arm 28 when the screw rotates in the direction for raising the trigger.

Figure 4:
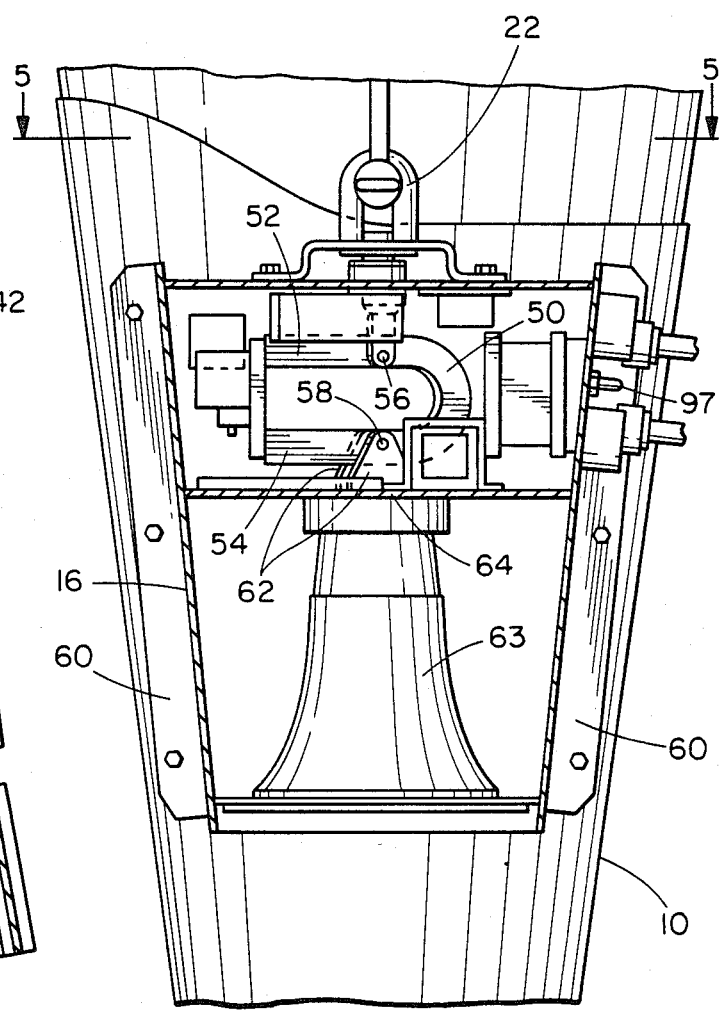
FIG. 4 is a sectional view through the load sensing device of the invention.
Figure 5:
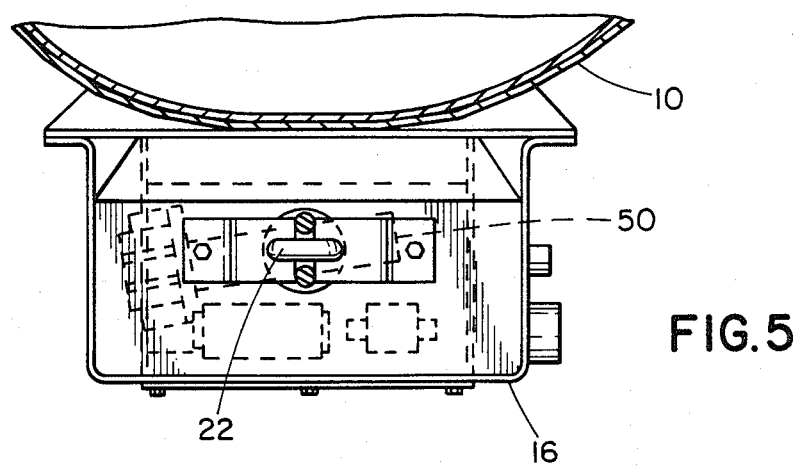
FIG. 5 is a plan view of the device of FIG. 4.

Referring to FIG. 4, U-shaped deflection yoke 50 has an upper leg 52 and a lower leg 54 which flex toward and away from each other. The yoke serves as a link between the link 22 and the funnel 10, bearing half of the weight of the funnel. The other half is borne by the link 20. A pin 56 in the upper leg 52 ties to the link 22. Another pin 58 ties to a pair of ears 62 which are welded to a plate 64 extending across the interior of the load sensor housing 16. The housing is secured to brackets 60 which are welded to the surface of the funnel.

Figure 6:
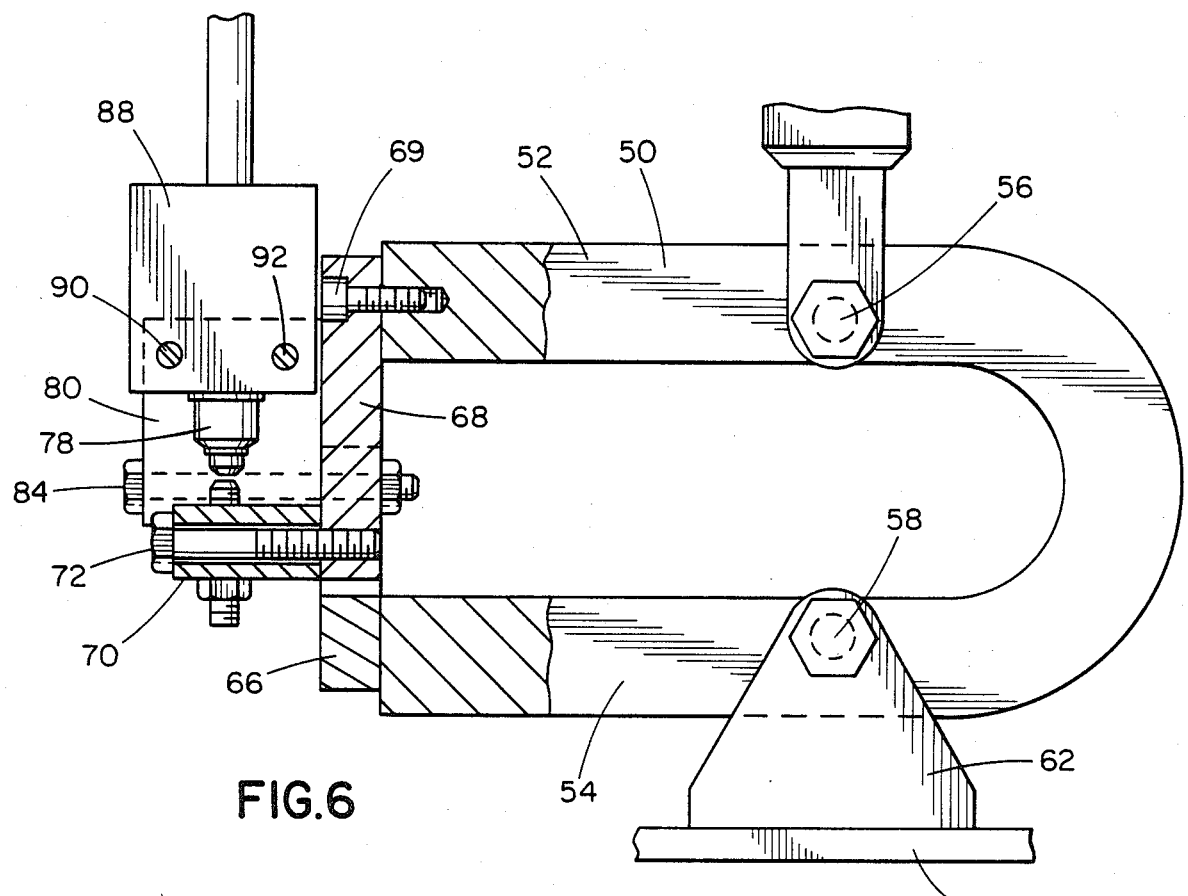
FIG. 6 is a sectional view along the line 6—6 of FIG. 7, showing the switch beam comprising part of the load sensing device.
Figure 7:
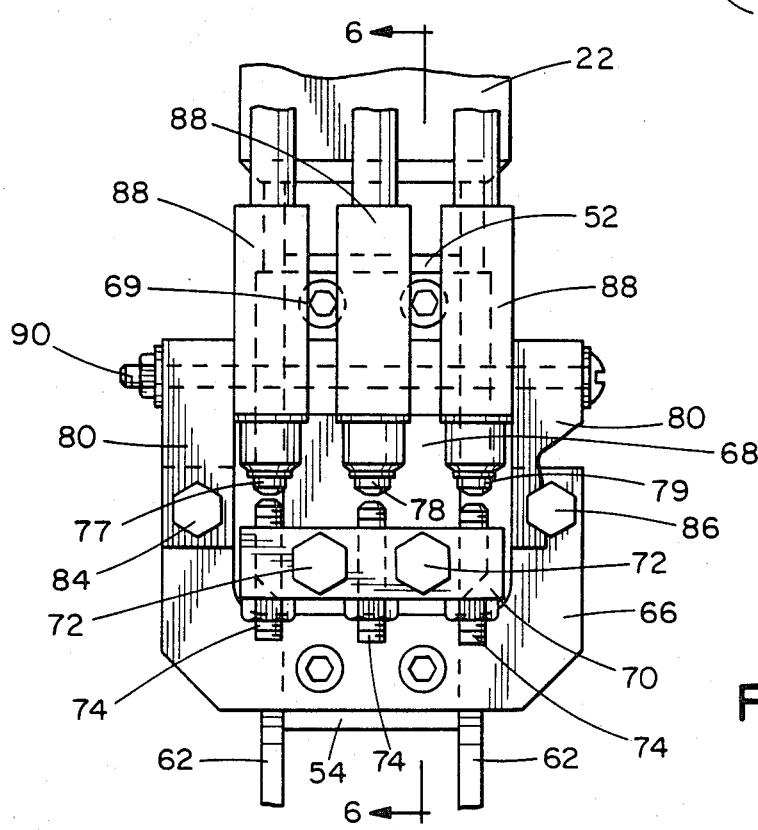
FIG. 7 is an end view of the switch beam looking toward the switches.

The controls for actuating the signaling device, stopping the conveyor motors, and releasing the tremie, are responsive to the deflection of the yoke 50. As shown in FIGS. 6 and 7, leg 54 carries a yoke 66 bolted to the end thereof, and leg 52 carries a plate 68 secured to the end thereof by bolts 69. The plate 68 fits inside the yoke. A block 70 is secured to the plate 68 by bolts 72 and supports three vertically-adjustable studs 74 screwed into the block. By this arrangement, the studs 74 will move only with the upper leg 52 of yoke 50.

Two switch mounting blocks 80 are connected to opposed legs of the yoke 66 by bolts 84,86. Blocks 80 on the right in FIG. 7 is broken away to show the top of yoke 66. Blocks 80 extend like brackets outwardly and upwardly from yoke 66. Three switch housings 88 are mounted between blocks 80 with bolts 90,92. Switch contacts 77,78,79, projecting from housings 88, are aligned with the studs. By this arrangement, the switch contacts 77,78,79 move only with the lower leg 54 of the yoke 50. Thus, when the legs of the yoke are spread because of increased weight on pin 58, the contacts move toward and into contact with the studs 74 to actuate the switches in the housings 88. The switches are in electrical circuits controlling the first signaling horn 63, and the motors driving the conveyors (contact 77), a second signaling means (contact 78), and the motor 42 of the linear actuator (contact 79). The distance between the contacts and the studs 74 is adjusted so that the controls are actuated in sequence in response to increasing weight on pin 58. The electrical circuitry is not shown, but is well known to those skilled in the art. Conductors 94 lead from switches to the motor 42 and conductors 96 (FIG. 2) lead to the conveyor motor control panel.

A reset button 97 is provided to extend linear activator 36 after the excess load on the tremie has been removed.

In operation the load sensor comes into play when the tremie becomes partially blocked and the flow of concrete is restricted. As concrete builds up in the tremie 12, the weight of the tremie increases, which increases the load on links 20,22 from which the funnel 10 and the tremie are suspended. Half of the total weight is taken by the link 22 which connects to the sensor through pins 56,58. The increased weight causes legs 52,54 to spread, thus moving the studs 74 toward the switch contacts. When the weight reaches a first predetermined value, stud 74 depresses contact 77, which is the closest to the stud. This actuates the switch in the housing 88 to break the circuit to the conveyor motors and to close a circuit to a warning horn or a warning light, which warns the operators of impending danger. In the event there is a delay in arresting the flow of concrete and the weight continues to increase to a second predetermined value, the second stud 74 strikes contact 76, which closes the circuit to another warning device or siren, indicating to the workmen that the tremie is about to be released and that the area must be immediately vacated. A relatively slight additional increase in weight causes the remaining stud 74 to press contact 79 which actuates the switch to the motor 42 which releases the tremie. The distance between the stud and the contact is adjusted so that the tremie is released before the weight reaches the point where it will topple the boom. Since studs 72 are adjustable, the switches can be actuated in direct response to the deflection of the yoke 50. The deflection, of course, is directly proportional to the increase in weight on the pin 58.

From the foregoing, it is apparent that the invention provides a warning which is indicative of the true weight of the tremie and funnel suspended from the end of the conveyor. The use of successive warnings permits the operators to remove the restriction or obstruction in the tremie, and establish once again the free flow of the concrete therethrough, and to do this before there is any danger of a collapse of the boom.

We claim:

1. In an elevated concrete-placing conveyor feeding into a tremie detachably secured to the end of the conveyor, a device for automatically preventing concrete overload in the tremie comprising means interposed between the tremie and the end of the conveyor which distends as the weight of the tremie increases;
said means comprising a U-shaped beam having one leg thereof connecting through link means to the end of the conveyor and the other leg thereof connecting through link means to the tremie,
a first pair of opposed, spaced contacts mounted on said distending means connecting with a circuit to a first-alarm means and to a circuit supplying power to said conveyor,
a second pair of opposed, spaced contacts mounted on said distending means and connecting to a circuit which supplies power to means for detaching said tremie from said conveyor,
whereby as the weight of the tremie increases to a first predetermined quantity, the first pair of contacts engage to actuate the alarm and stop the conveyor, and as the weight to the tremie increases to a second predetermined quantity, the second pair of contacts engage to detach the tremie.

2. The overload-preventive device of claim 1 which includes a third pair of opposed, spaced contacts said third pair of contacts connecting to a second alarm means which is actuated as the weight of the tremie increases to a predetermined quantity greater than said first but less than said second predetermined quantities, thereby actuating said second alarm means, after said first alarm means but prior to detaching the tremie.

3. The overload-preventive device of claim 1 in which one of each said pairs of contacts is mounted on a base secured to one leg of said U-shaped beam, said contacts connecting to switches in said alarm and power circuits, and the other of each pair of contacts is mounted on a base secured to the other leg of said U-shaped beam, said other contacts being adjustable with respect to their mounting base to permit controlling the distance between each pair of opposed contacts.

4. The overload-preventive device of claim 3 in which said U-shaped beam is horizontally disposed and said bases are mounted one above the other,
the lower base being secured to the upper leg of said U-shaped beam and the upper base being secured to the lower leg of said U-shaped beam, said securing means consisting of a scissors arrangement,
whereby the distance between said pairs of contacts decreases as the distance between the legs of said beam increases.

5. In an elevated concrete placing conveyor, a funnel suspended from the end of said conveyor, a tremie detachably secured to the lower end of said funnel by link means, weight-sensing means comprising a U-shaped beam having one leg connecting to said lower end, and the other end connecting to said tremie, trigger means for opening said link means to detach said tremie, and means responsive to the distension of said legs due to weight in said tremie to actuate said trigger.

6. Conveyor of claim 5 which includes alarm means also responsive to said weight-sensing means.

7. Conveyor of claim 5 in which said weight-sensing means is mounted on a side of said funnel near the top thereof and said trigger means is mounted on a side of said funnel near the bottom thereof, and both means are enclosed to protect them from concrete.

8. The conveyor of claim 5 in which said link means comprises a chain secured at one end to a rotatable arm, and said trigger is normally engaged with said rotatable arm to prevent rotation thereof, and a motor for actuating said trigger to disengage it from said arm to permit the arm to rotate and thereby release the chain.

9. The conveyor of claim 8 in which said link means includes a toggle lever for tightening said chain around the tremie.

* * * * *